INVENTOR:
RICHARD TATSCH,
BY HIS ATTORNEYS
HARRIS, KIECH, FOSTER & HARRIS

Dec. 9, 1952    R. TATSCH    2,621,027
PANEL HEATING AND COOLING SYSTEM
Filed Dec. 11, 1946    4 Sheets-Sheet 3
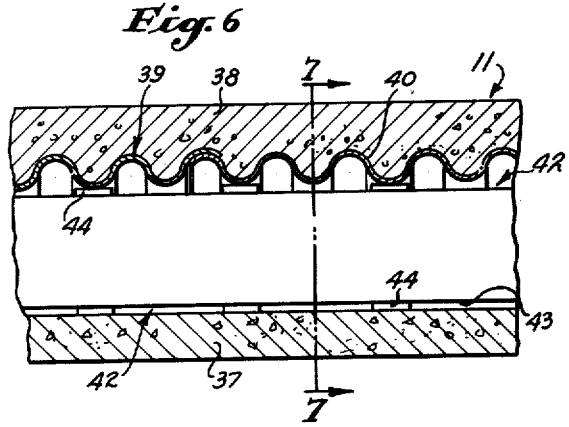
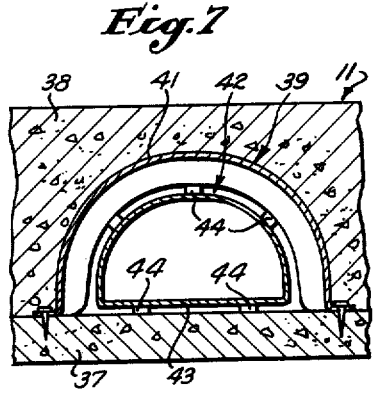
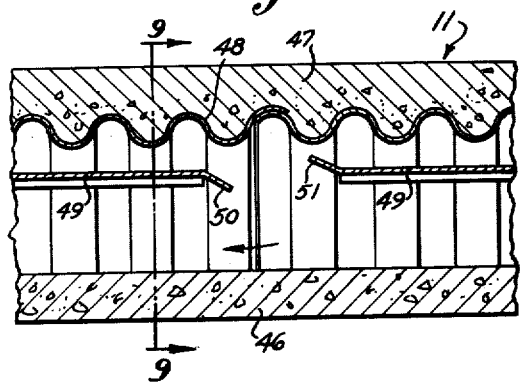
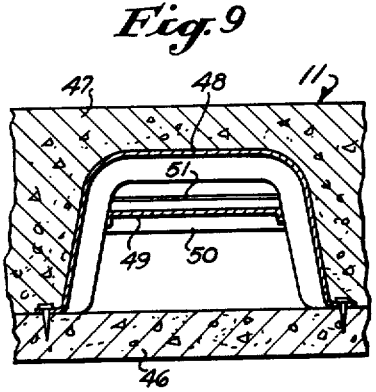
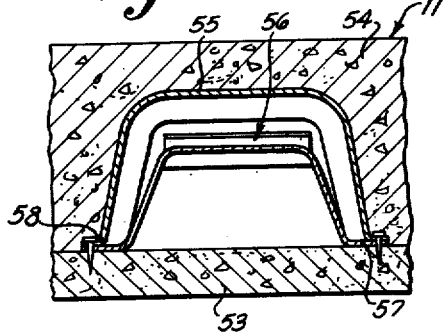
INVENTOR:
RICHARD TATSCH
By His Attorneys
HARRIS, KIECH, FOSTER & HARRIS Dec. 9, 1952         R. TATSCH         2,621,027
PANEL HEATING AND COOLING SYSTEM
Filed Dec. 11, 1946         4 Sheets-Sheet 4
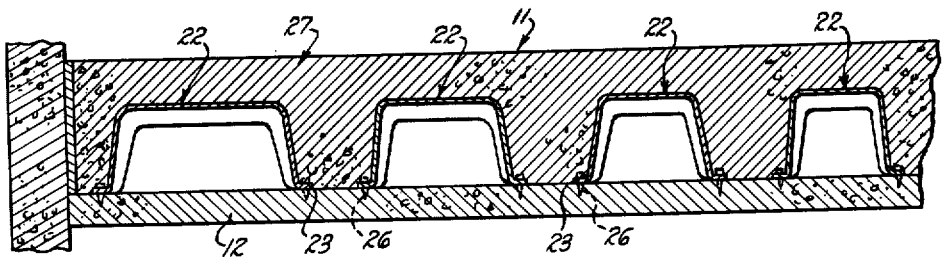
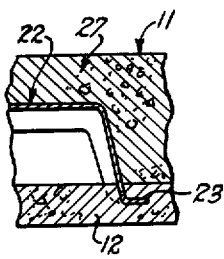
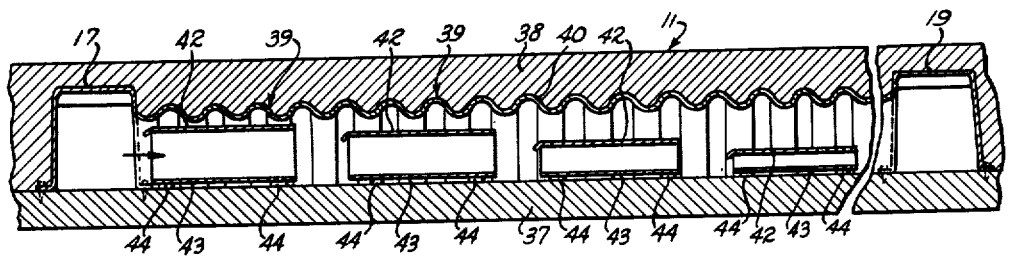
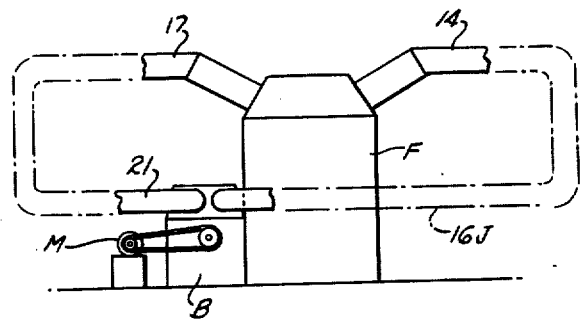
INVENTOR:
RICHARD TATSCH
BY HIS ATTORNEYS
HARRIS, KIECH, FOSTER & HARRIS Patented Dec. 9, 1952

2,621,027

UNITED STATES PATENT OFFICE 2,621,027

PANEL HEATING AND COOLING SYSTEM

Richard Tatsch, El Monte, Calif.

Application December 11, 1946, Serial No. 715,462

7 Claims. (Cl. 257—124)

My invention relates to a heat transfer system and more particularly to a system in which space, such as the space in a residence or office building, is heated or cooled to provide comfort for individuals occupying such space. My invention contemplates a heat transfer system in which a heating or cooling fluid, such, for example, as air, is circulated in conduits within one or more side or end walls or the ceiling or floor of a room, all of which are included within the term "wall" as employed herein.

Among the objects of my invention is the provision of such a heat transfer system which is superior to those heretofore employed in its cost of installation. This object is accomplished by providing conduits for the cooling or heating medium which may be formed of thinner material, for example, metal, and of sections more quickly and less expensively connected than existing systems. More particularly the cost of installation of such a heat transfer system is very substantially reduced by forming the conduit for the heating or cooling medium of a material which is corrugated. These corrugations by strengthening the conduit against deformation permit the conduit to be made of thinner material than conduit which is not corrugated. Further, such corrugations permit the adjacent sections and elbows of the conduit to be connected by merely overlapping them in frictional engagement, such overlapping of parts of one, or more than one corrugation presenting a barrier to the passage of cement or mortar therebetween during the placing and hardening of a cement wall therearound and eliminating the necessity of rivets, seam locks, solder, welding, or similar connections of the adjacent sections and elbows.

Another object of my invention is to provide a heat transfer system of the class described providing a greater efficiency of heat transfer than the systems now available. This object is accomplished also by providing corrugations in the conduit through which the heating or cooling medium is passed, thus substantially increasing the heat transfer area of the conduit per unit of its length.

Another object of my invention is to provide a heat transfer system having means therein for varying the rate of heat transfer longitudinally of the system, whereby this rate may be maintained constant throughout the length of the system or varied to any desired value at any given locus.

Embodiments of my invention capable of performing the foregoing objects and providing the foregoing advantages and others are described in the following specification, which may be more readily understood by reference to the accompanying drawing in which Fig. 1 is a sectional plan view of one embodiment of my invention illustrating two forms of conduits which may be employed in accordance with my invention;

Fig. 6 is a longitudinal sectional view of an embodiment of my invention which includes one form of baffle means;

Fig. 7 is a transverse sectional view taken as indicated by the line 7—7 of Fig. 6;

Fig. 8 is a longitudinal sectional view of an embodiment of my invention which includes another form of baffle means;

Fig. 9 is a transverse sectional view taken as indicated by the line 9—9 of Fig. 8;

Fig. 10 is a transverse sectional view of an embodiment of my invention which includes still another form of baffle means;

Fig. 11 is a fragmentary cross section similar to that in Fig. 2 and showing a modified form of construction;

Fig. 12 is a cross sectional detail showing a further modification;

Fig. 13 is a longitudinal section similar in some respects to that of Fig. 6 and showing another modification; and Fig. 14 is a diagrammatic view indicating the relationship in general of the improvements of this invention to means for conditioning and circulating air.

Figure 1:
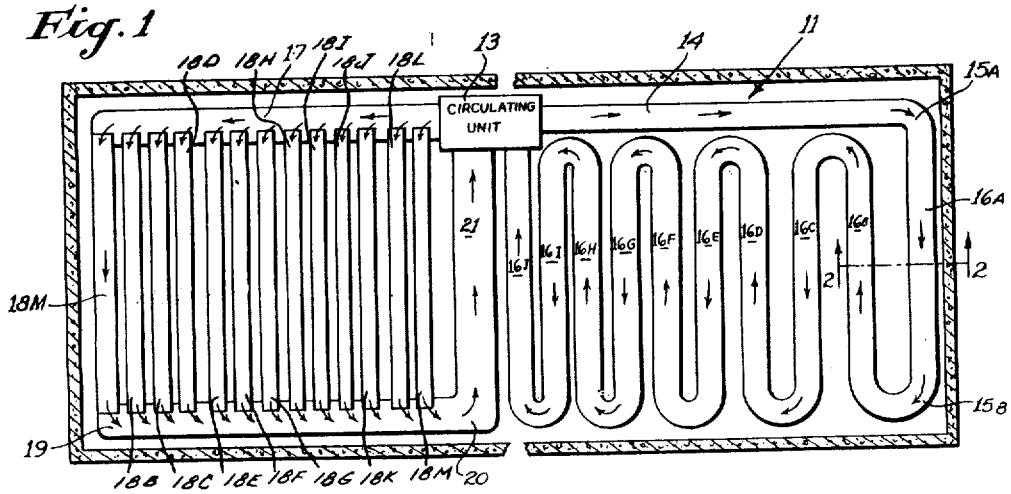

Referring to the drawing, which is for illustrative purposes only, the numeral 11 refers to a floor of a room, the floor being that one of the walls previously defined in which I have chosen to illustrate the installation of the system of my invention, it being, of course, understood that the system may be installed in any of the other walls of the room.

Figure 2:
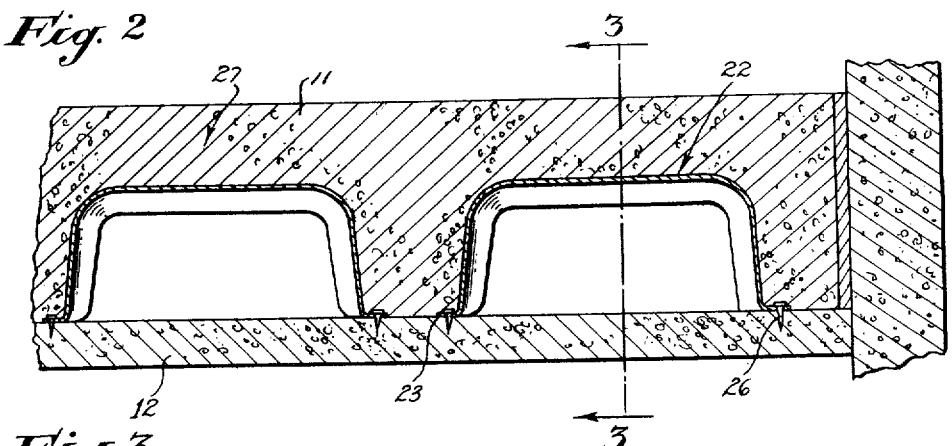
Fig. 2 is an enlarged transverse sectional view of the conduit of the heat transfer system illustrated in Fig. 1 and taken as indicated by the line 2—2 of Fig. 1.

The floor, as illustrated best in Fig. 2, includes a base slab or panel 12 which is formed of cement.

As the term "cement" is employed herein, it is intended to include any material which hardens into a wall of required structural strength from a plastic, liquid, or viscous state, as, for example, concrete, whether or not it contains before hardening solids, such, for example, as sand, rock, reinforcing steel, or tile, and whether or not it is hardened at the locus of use. If the floor 11 is constructed in the conventional manner, the base panel 12 is formed of concrete which is hardened in place.

The numeral 13 indicates a circulating unit which operates to force a fluid, such as air under pressure, through the heat transfer system. The circulating unit 13 may be of any appropriate form connected to means remote from the floor 11 for heating or cooling the air and forcing it under pressure through the manifold. Connected to the right-hand side of the circulating unit 13 is a header 14 which is connected by an elbow 15A to a conduit section 16A. The numerals 16B and 16J, inclusive, indicate parallel conduit sections all similar in construction. Adjacent of the conduit sections 16B to 16J, inclusive, are connected by 180° elbows 15B. The conduit section 16J is connected either to the circulating unit 13 for the return of the air to the source of heat or cooling and compression or an exhaust to the atmosphere. The circulating unit 13 diagrammatically indicated in Fig. 1 is typified in Fig. 14 as a blower B of which the air moving unit may be driven by a motor M, and the source of heat or cooling typified by an air conditioning unit F which for heating purposes might be a furnace.

On the left-hand side of the circulating unit 13 there is illustrated in Fig. 1 a different form of conduit. An inlet header 17 connects to the manifold 13 in parallel a plurality of conduit sections 18A to 18M, the other ends of which are connected to an outlet header 19. The outlet header 19 is connected through a 180° elbow 20 to an exhaust section 21 which returns the air through the circulating unit 13 to the source of heat or cooling or compression or exhausts it to the atmosphere.

Each of the headers 14, 17, and 19, conduit sections 16A to 16J and 18A to 18M, and the exhaust section 21 is preferably formed so that in transverse cross section its outline is that of an incomplete polygon which may be of any form desired, such, for example, as a portion either more or less than half of a circle, three sides of a square or rectangle, or two sides of a triangle. I have illustrated the outline of the incomplete polygon in Fig. 2 as including the three sides of a rectangle connected together with arcs, this outline being indicated in general by the numeral 22 and the projecting flanges by the numeral 23.

The elbows 15A, 15B, and 20 are formed of similar cross-sectional outline so that adjacent elbows and conduit sections may be placed in overlapping relationship and in frictional engagement with each other.

Figure 3:
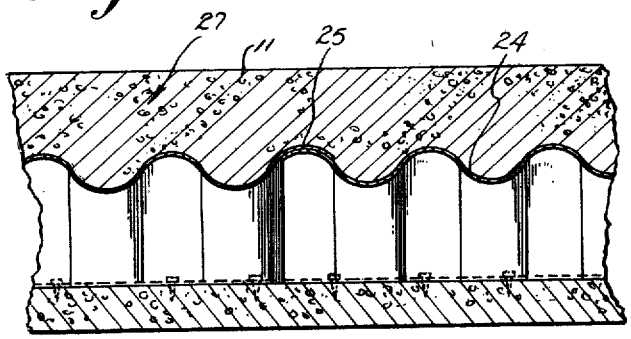
Fig. 3 is a fragmentary longitudinal sectional view of such conduit taken as indicated by the line 3—3 of Fig. 2.

As is illustrated best in Figs. 2 and 3, the conduit sections 16A to 16J and 18A to 18M (and preferably, though not necessarily the headers 14, 17, and 19 and the exhaust section 21) are formed with circumferential corrugations 24. Such corrugations may be in the form of curved surfaces or angled plane surfaces providing crests and valleys and extend circumferentially around the conduit sections and the elbows either in planes normal to or an angle other than 90° with the axis of the sections and elbows, all such corrugations being included within the term "circumferential corrugations" as employed herein.

In the installation of the conduit sections and elbows of the system of my invention the base panel 12 is first poured in place. When the base panel 12 has hardened, the conduit sections and elbows are arranged in the desired relative relationship. Adjacent conduit sections and elbows are connected by overlapping a portion of one with the other, as indicated by the numeral 25 of Fig. 3, by enlarging, slitting, or reducing the end of one section or in any other suitable manner. Thereafter the overlapped conduit sections and elbows are secured to the hardened base panel 12 by connecting the flanges 23 thereof to the base panel 12, as, for example, by driving short hardened nails 26 (which can be driven into concrete and are known as "concrete nails") through the flanges 23 into the base panel 12. If preferred, the conduit sections and elbows may be secured to the base panel 12 by pressing the flanges 23 into the base panel 12 before the final set of the base panel 12, so that, when the base panel 12 is hardened, the flanges 23 are securely embedded therein as indicated in Fig. 12.

After all of the conduit sections and elbows are thus connected together and secured to the base panel 12, either for the entire wall or floor or a section thereof, an outer cement wall portion, indicated by the numeral 27 of Figs. 2 and 3, is poured or placed to complete the panel or a section thereof. The impact of the outer wall portion 27, when it is poured or placed in a liquid or plastic condition upon the conduit sections and elbows, serves to press the overlapping portions 25 of the adjacent conduit sections and elbows more closely together and to press the flanges 23 more closely against the base panel 12 so that the entry of the outer cement wall portion 27 in its liquid or plastic condition into the interior of the conduit sections and elbows is effectually prevented.

Attention is directed to the fact that adjacent conduit sections and elbows are connected above the base panel 12 only by frictional contact, and that there is no necessity in view of the overlapping portions 25 of the corrugations 24 for the expenditure of time, effort, or money in connecting such sections and elbows by rivets, seam locks, solder, welding, or otherwise. It will be seen that such facility of connection provides a great economy of installation.

The impact of the outer cement wall 27 during its pouring or placing in a liquid or plastic condition and the weight of this outer wall portion 27 in its liquid or plastic condition are resisted, and deformation of the conduit sections and elbows consequent thereto is prevented by the corrugations 24. It will be apparent that the circumferential corrugations 24 thus permit of the fabrication of the conduit sections and elbows of a thinner material, for example, metal, than could be employed without the corrugations, and that the corrugations therefore provide a substantial economy of fabrication. Furthermore the circumferential corrugations 24 provide a greatly increased area of contact between the conduit sections and elbows and the outer wall portion 27, and hence a substantially increased area of heat conduction. In this manner a very substantial increase in efficiency of heat transfer is accomplished. Furthermore the corrugations increase the heat transfer by turbulence created in the heating or cooling medium and the avoidance of laminar flow of such medium within the conduit sections which would provide an insulating layer of such medium adjacent the wall of the sections.

If the conduit sections 16A to 16J, inclusive, and the conduit sections 18A to 18M, inclusive, are spaced uniformly and are of uniform cross-sectional area, satisfactory results are achieved, although there may be somewhat less heat transferred to the outer wall portion 27 per unit of its area near the outlet ends of such conduit sections than near their inlet ends. Uniformity of such heat transfer over the area of the outer wall portion 27 may be secured by spacing such conduit sections nearer together progressively along the path of travel of the air therethrough. This is illustrated in the spacing of the conduit sections 16A to 16J, inclusive, of Fig. 1 where the conduit sections of uniform cross-sectional area are so spaced. In a similar manner, such uniformity of heat transfer may be accomplished by spacing uniformly conduit sections of cross-sectional areas increased progressively along the path of travel of the air therethrough as seen in Fig. 11.

Figure 4:
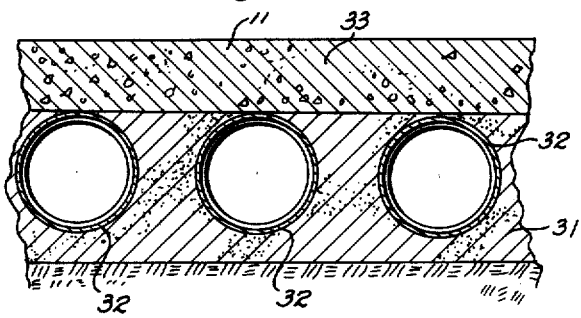
Fig. 4 is a transverse sectional view of an alternative embodiment of my invention.

In the alternative embodiment of my invention illustrated in Fig. 4 there is provided a base 31 of sand, gravel, or the like in which conduit sections 32 are embedded. An outer wall portion 33 of cement is poured or placed upon these conduit sections 32 and in heat transferring relationship therewith. The conduit sections 32 are connected together by elbows similar to those previously described, and both the conduit sections and such elbows are provided with corrugations similar to the corrugations 24. However, the conduit sections 32 and their connecting elbows in the form illustrated in Fig. 4 are in cross-sectional outline complete polygons, and in the embodiments illustrated in Fig. 4 these outlines are circular.

Figure 5:
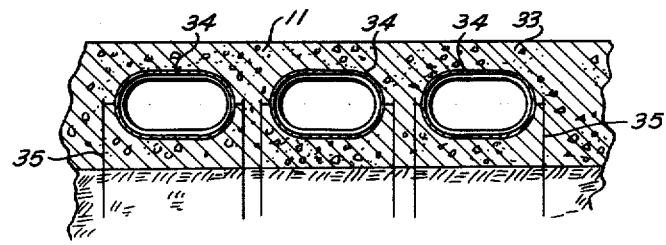
Fig. 5 is a transverse sectional view of another alternative embodiment of my invention.

In the embodiment of my invention illustrated in Fig. 5 conduit sections 34 are cast in monolithic slabs of a wall, being supported during the pouring and setting of the concrete by suitable ties 35 which may be wires. The conduit sections 34 are connected by elbows in the manner described in connection with Figs. 1 to 3 and are provided with corrugations similar to the corrugations 24. In this alternative embodiment of my invention the conduit sections and elbows are in cross-sectional outline in the form of complete polygons, the forms illustrated in Fig. 5 being ellipses.

In the embodiment of my invention illustrated in Figs. 6 and 7 the numerals 37 and 38 indicate a base panel and outer wall portion similar to the base panels and outer wall portions previously described, and the numeral 39 indicates conduit sections having corrugations 40 similar to those herein referred to except that they have an outline 41 semi-elliptical in form.

Mounted upon the base panel 37 within the conduit sections 39 is a baffle member 42 having an outline generally similar to the outline 41 of the conduit sections 39 except that the baffle member 42 is spaced from the inner surface of the conduit sections 39 and may be fabricated without corrugations. The baffle member 42 includes a base portion 43 which may be secured in any suitable manner to the base panel 37, the baffle member being spaced from the base panel 37 and the conduit sections 39, if desired, by insulating strips or tabs 44.

Thus, as indicated in Fig. 6, the baffle member 42 operates to divide the stream of fluid passing through the conduit system so that only a relatively small portion of this fluid passes between the baffle member 42 and the conduit sections 39. Hence, adjacent the baffle member 42 heat is transferred from within the member 42 by radiation and the heat transfer through the conduit sections 39 is substantially reduced. Or, as shown in Fig. 13, a plurality of such baffle members 42, each of lesser length than the conduit system, may be spaced along the conduit sections 39, and they may be spaced varying distances from the adjacent conduit sections to provide the desired variation in the rate of heat transfer through the adjacent conduit sections.

Referring to Figs. 8 and 9, the numerals 46, 47, and 48 indicate respectively a base panel, outer wall portion, and conduit section similar to those previously described. The numeral 49 indicates a baffle member which, as illustrated in Fig. 9, may be in the form of a horizontal plate secured at its edges to the inner wall of one or more of the conduit sections 48. The baffle member may be bent downwardly at one of its extremities, as indicated by the numeral 50, or upwardly, as indicated by the numeral 51, as may be required to control the proportion of the heating or cooling fluid which passes between the baffle member and the adjacent conduit section 48.

As illustrated in Figs. 8 and 9, the baffle members 49 are spaced a greater distance from the adjacent conduit sections 48 than the spacing between the members 39 and 42 of Figs. 6 and 7, so that the rate of heat transfer through the conduit sections 48 is greater than the rate of heat transfer through the conduit sections 39 which have the baffle members 42 closer thereto.

In the embodiment illustrated in Fig. 10 the numerals 53, 54, and 55 indicate a base panel, outer wall portion, and conduit section like those hereinbefore described. Mounted within one or more of the conduit sections 55 is a baffle member 56 having flanges 57 which are secured to the base panel 53, as are the flanges 58 of the conduit sections 55. The baffle member 56 is spaced a greater distance from the adjacent conduit section 55, so that the rate of heat transfer through the adjacent conduit section 55 is greater for a given flow of the heating or cooling medium through the system than the rate of heat transfer in the embodiments illustrated in Figs. 6 and 7 or Figs. 8 and 9. The rate of heat transfer may be further increased by making the baffle members 56 of lesser longitudinal length.

In connection with the structure of Figs. 8 to 10, the main stream of fluid is passed between the baffle members 49 and the base panel 46 in the direction of the arrow seen in Fig. 8. Assuming the use of hot air, the diverter 50 on the end of the left baffle member 49 (as the parts are viewed in Fig. 8) at each respective position directs a portion of the hot, main stream into the space between the left baffle member 49 and the conduit section 48, and cooled air above the right baffle member 49 and partially obstructed by the flange 51 thereon sinks through the corrugations in the sides of the conduit section 48 at the edges of such right baffle member 49. Since the cooperating faces of the baffle members 49 and the base panel 46 are smooth as compared with the corrugated conduit sections 48, the main stream passing below the baffles 49 initially moves much faster than the heating stream above them. A similar condition results when using the structure of Fig. 13.

From the foregoing it will be apparent that the baffle members may be secured within the conduit sections either by attaching them directly to the conduit sections as by soldering, welding, riveting, crimping, or the like, or they may be laid upon the base panel and held in place by the surrounding conduit section, or they may be firmly secured to the base panel before the conduit sections are placed therearound. The baffles may be formed of metal or material of high insulation value, as may be desired, to secure the required variation in the rate of heat transfer through the conduit sections.

While those embodiments of my invention hereinbefore illustrated and described are capable of performing the objects and providing the advantages primarily stated, various modifications of these forms also embodying my invention and likewise accomplishing such objects and providing such advantages will occur to those skilled in the art, and my invention is therefore to be understood as not restricted to the physical forms described for illustrative purposes but as including all of the modifications coming within the scope of the claims which follow.

I claim as my invention:

1. In a heat transfer system, the combination of: a wall including a cement base and an outer cement portion having an exposed surface; a fluid circulating means; and a conduit connected to said means and having a cross-sectional outline of an incomplete polygon with projecting flanges secured to said cement base when hardened whereby said conduit and said base define a fluid passage and said base supports said conduit during the placing and hardening of said outer wall portion around and over said conduit, said conduit being formed of thin heat-conducting material with circumferential corrugations substantially increasing its heat-conducting area and its resistance to deformation, and said conduit comprising sections and elbows adjacent of which are connected above said base only by frictional contact throughout overlapping portions thereof.

2. In a heat transfer system, the combination of: a wall including a cement base and an outer cement portion having an exposed surface; a fluid circulating means; and a conduit connected to said means and having a cross-section sectional outline of an incomplete polygon with projecting flanges secured to said cement base when hardened whereby said conduit and said base define a fluid passage and said base supports said conduit during the placing and hardening of said outer wall portion around and over said conduit, said conduit being formed of thin heat-conducting material with circumferential corrugations substantially increasing its heat-conducting area and its resistance to deformation.

3. In a heat transfer system, the combination of: a closure including a base and an outer cement wall; a fluid circulating means; and a conduit connected to said fluid circulating means and in heat transfer relationship with and embedded in and covered by said cement wall, said conduit comprising sections and connecting elbows having cross-sectional outlines in the form of incomplete polygons with projecting flanges secured to said base whereby said sections, elbows, and base cooperate to define a fluid passage, and said sections and elbows being formed with circumferential corrugations substantially increasing the heat transfer area of said conduit and its resistance to deformation, adjacent of said sections and elbows overlapping, the spacing of adjacent sections being progressively decreased in the direction of travel of the circulating fluid so that the heat transfer between the fluid in said passage and the surface of said wall approximates uniformity throughout the effective length of said passage.

4. In a heat transfer system, the combination of: a closure including a base and an outer cement wall; a fluid circulating means; and a conduit connected to said fluid circulating means and in heat transfer relationship with and embedded in and covered by said cement wall, said conduit comprising sections and connecting elbows having cross-sectional outlines in the form of incomplete polygons with projecting flanges secure to said base whereby said sections, elbows, and base cooperate to define a fluid passage, and said sections and elbows being formed with circumferential corrugations substantially increasing the heat transfer area of said conduit and its resistance to deformation, adjacent of said sections and elbows overlapping in frictional engagement.

5. In a heat transfer system for a space having a cement wall as one boundary, the combination of: a fluid circulating means; and a conduit connected to said fluid circulating means and embedded in and in heat transfer relationship with and covered by the cement wall, said conduit including sections and connecting elbows formed with circumferential corrugations increasing the heat transfer area of said conduit and resisting deformation of said conduit, adjacent of said sections and elbows overlapping in frictional engagement, the cross-sectional area of said sections progressively increasing in the direction of travel of the circulating fluid so that the heat transfer between the fluid in said conduit and the surface of said wall is approximately uniform over the surface of said wall.

6. In a heat transfer system, the combination of: a closure including a base and an outer cement wall; a fluid circulating means; a heat transferring conduit connected to said fluid circulating means and in heat transfer relationship with and embedded in and covered by said cement wall, said conduit comprising sections and connecting elbows having cross-sectional outlines in the form of incomplete polygons with projecting flanges secured to said base whereby said sections, elbows, and base cooperate to define a fluid passage, and said sections and elbows being formed with circumferential corrugations substantially increasing the heat transfer area of said conduit and its resistance to deformation, adjacent of said sections and elbows overlapping in frictional engagement; and baffle means providing a conduit within and spaced from said heat transferring conduit and communicating with the space of said heat transferring conduit at longitudinally spaced intervals for controlling the flow of fluid in contact with said heat transferring conduit.

7. In a heat transfer system for a space having a cement wall as one boundary, the combination of: a fluid circulating means; a heat transferring conduit connected to said fluid circulating means and in heat transfer relationship with and covered by the cement wall, said conduit including sections and connecting elbows, and said sections being formed with circumferential corrugations increasing the heat transfer area of said sections and resisting deformation of said sections; and baffle means carried by said conduit and spaced from said base and the opposite wall of said conduit, said baffle means being of lesser length than said conduit and disposed progressively at greater distances from said sections for varying the rate of heat transfer through said conduit adjacent said baffle means by correspondingly dividing the stream of fluid flowing through said conduit.

RICHARD TATSCH.

REFERENCES CITED

The following references are of record in the file of this patent:

UNITED STATES PATENTS

| Number | Name | Date |
|---|---|---|
| Re. 2,297 | Robbins | June 26, 1866 |
| 899,078 | Salmon | Sept. 22, 1908 |
| 1,049,542 | Smith | Jan. 7, 1913 |
| 1,242,473 | Prentice | Oct. 9, 1917 |
| 1,406,852 | Haden et al. | Feb. 14, 1922 |
| 1,642,631 | Stevens | Sept. 13, 1927 |
| 1,729,612 | Goldsmith | Oct. 1, 1929 |
| 1,753,496 | Barton | Apr. 8, 1930 |
| 1,941,211 | Inglee | Dec. 26, 1933 |
| 2,144,626 | Hewitt | Jan. 24, 1939 |
| 2,200,397 | Monson | May 14, 1940 |
| 2,211,813 | Franco-Ferreira | Aug. 20, 1940 |

FOREIGN PATENTS

| Number | Country | Date |
|---|---|---|
| 2,009 | Great Britain | July 27, 1914 |